(12) United States Patent
Menahem

(10) Patent No.: US 12,211,364 B2
(45) Date of Patent: Jan. 28, 2025

(54) PARAMETER PRIORITIZED HIRABLE EMERGENCY SERVICE PROVIDERS

(71) Applicant: Sean Ben Menahem, Agoura Hills, CA (US)

(72) Inventor: Sean Ben Menahem, Agoura Hills, CA (US)

( * ) Notice: Subject to any disclaimer, the term of this patent is extended or adjusted under 35 U.S.C. 154(b) by 171 days.

(21) Appl. No.: 17/547,027

(22) Filed: Dec. 9, 2021

(65) Prior Publication Data

US 2023/0186754 A1    Jun. 15, 2023

(51) Int. Cl.
*H04W 4/90* (2018.01)
*G08B 25/00* (2006.01)
*H04W 4/029* (2018.01)

(52) U.S. Cl.
CPC .......... *G08B 25/006* (2013.01); *H04W 4/029* (2018.02); *H04W 4/90* (2018.02)

(58) Field of Classification Search
CPC ... G08B 25/006; G08B 27/001; H04W 4/029; H04W 4/90
See application file for complete search history.

(56) References Cited

U.S. PATENT DOCUMENTS

| | | | |
|---|---|---|---|
| 9,767,677 B1* | 9/2017 | Paulin | G08B 25/005 |
| 2009/0298461 A1* | 12/2009 | O'Reilly | H04M 3/42374 |
| | | | 455/404.2 |
| 2015/0044983 A1* | 2/2015 | Nasir | H04L 12/1895 |
| | | | 455/404.2 |
| 2019/0156646 A1* | 5/2019 | Richey | G08B 21/10 |

* cited by examiner

*Primary Examiner* — Marcos L Torres
(74) *Attorney, Agent, or Firm* — James A. Italia; Italia IP

(57) ABSTRACT

A method for automated operation of a system for summoning help from emergency responders is shown and described. A database contains identity and qualifications of potential responders, as well as their geographic locations. Upon receipt of a call for assistance, the system prioritizes available responders based on qualifications and estimated response time. All of these parameters can be updated in real time to reflect changing conditions, with a list of proposed responders being reprioritized accordingly. The system automates data which formerly was verified manually, and also prioritizes proposed responders relying on parameters based on appropriateness for the specific type of emergency.

7 Claims, 5 Drawing Sheets

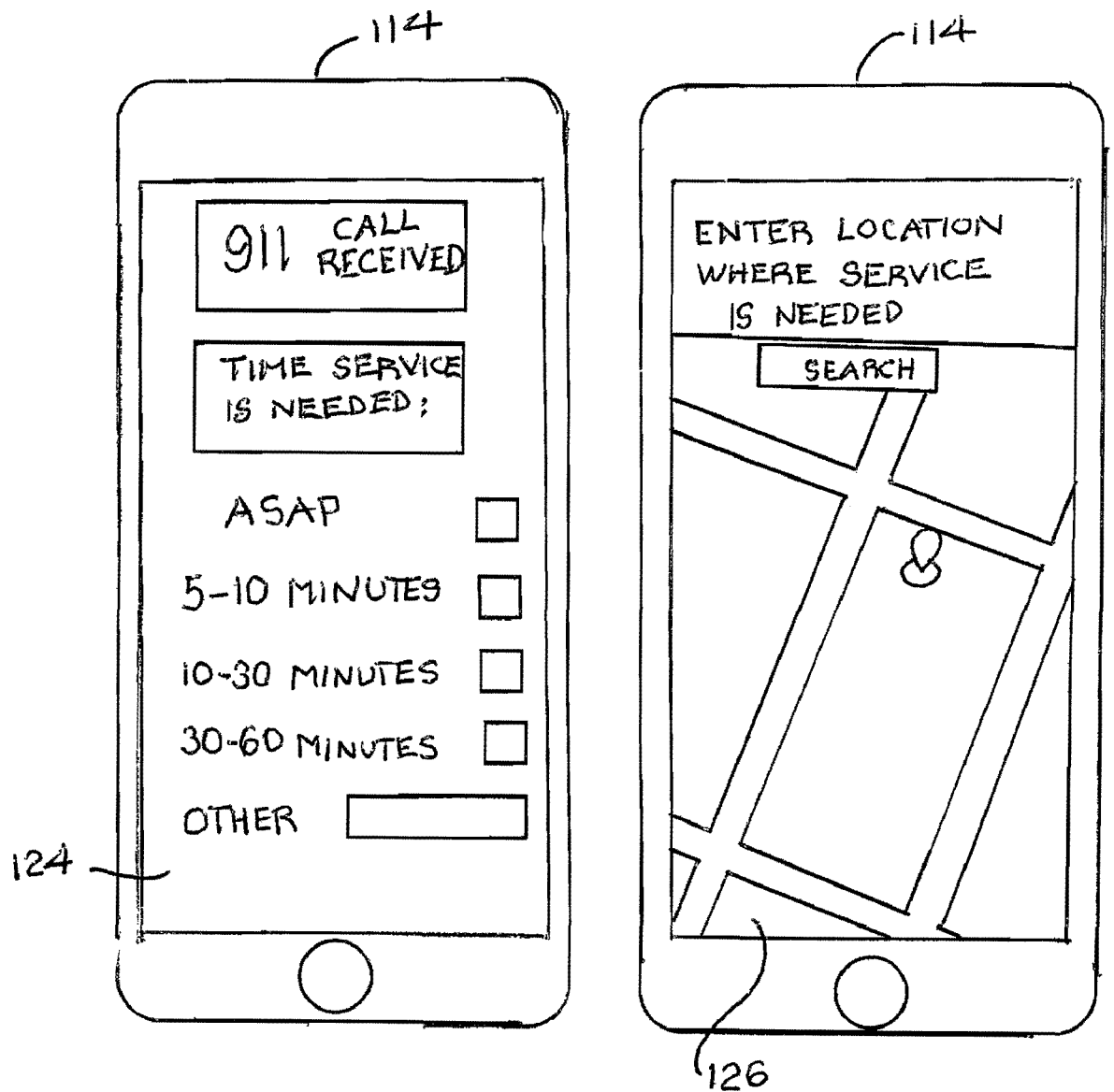

PARAMETER PRIORITIZED HIRABLE EMERGENCY SERVICE PROVIDERS

FIELD OF THE INVENTION

The present invention relates to administration of emergency response personnel tasked with responding to an emergency called in to a response authority such as police, fire, rescue, and medical or counseling personnel, a 911 call center, and the like.

BACKGROUND OF THE INVENTION

Emergency situations frequently occur in society, and require a response by personnel trained and equipped appropriately for the situation. Such emergencies may include individuals under physical or mental stress, crimes, fires, vehicle collisions, building collapses, boat, rail, and airway mishaps, and major industrial or agricultural failures, explosions, earthquakes, tsunamis, hurricanes, and like incidents.

An observer wishing to summon assistance typically has limited but relevant choices, including calling police, fire and rescue stations, medical or counseling personnel, or an umbrella organizations such as a 911 call center, the latter of which will contact the most appropriate responders. The actual responders typically comprise those awaiting an assistance call, and are not selected based on qualifications within the pool of potential responders, and not on qualifications appropriate to the emergency.

In addition, depleted law enforcement forces are overburdened and need help for calls that can essentially be outsourced, so there is a need where certain emergency services can be outsourced. But equally important is that emergency circumstances involving depressed or anxious teenagers or the like would be better served with a mental health provider showing up and dealing with the individual rather than a police officer untrained in mental health emergency events. Thus, there is at least a need that when emergency calls come in to a 911 type service, the operator/administrator is able to assess the need for a particular event and can make a determination that the emergency can be outsourced to a mental health provider, security detail, or both.

SUMMARY OF THE INVENTION

The present invention unites all responding participants in an emergency situation in a single communications system, and also automates prioritization of individual responders among a pool of candidates of responders. The system accommodates real time reassessment and prioritizations dependent upon updated data for each responder.

Using for example, an application downloaded onto a cell phone, an observer calls an appropriate source of assistance, reaching a system administrator. The administrator can contact all available responders. In certain circumstances, the observer can also be the administrator such as a teacher or parent. Using automated prioritization, a first or initial selection of one or more responders is generated. This first selection can be modified when availability of specific responders changes, or when emergency site conditions change. Inputs based on such changes automatically propose a revised list of prioritized responders.

Each potential responder has a smart phone or other data processing communications device for communicating with the administrator. Locations of responders, their qualifications, encompassing professional training, historical performance in the role of emergency responder, and current location and availability may be graphically presented on the smart phones.

This arrangement assures that the best responders be deployed to assist with the request for assistance, and that choices that previously required person-to-person confirmation and laborious calculations and comparisons be accomplished in seconds.

This invention relates to a platform for providing service providers with the opportunity to access a hirable workforce/service providers for supplementing its services at a moment's notice. In a preferred embodiment, the service provider is a police department that has been contacted with an emergency via a 911 call or other form of communication. The call is identified as requiring a mental health expert to send to the location. The operator is able to access the invention either by website or mobile application. In either case, the nature of the emergency and the location of the emergency is inputted into the invention. The invention is able to locate hirable/available service providers such as social service workers that are specialized for the particular emergency inputted and who are located in the geographic vicinity of the emergency.

The invention would be able to rank the available service providers from most desirable to least desirable given how well the parameters of expertise and geographic vicinity are met. For example, a service provider that specializes in the emergency type, has years of experience, has received positive reviews, and is located nearest to the emergency would be ranked at the top of the list to ease the operator's selection of the service provider for dispatch. The operator could even rank what parameter is more important given the situation. For example, in some emergencies, geography and speed of response time might be more important than the expertise of the service provider. The operator is then able to use the invention to select the most desirable service provider, based on the given parameters, for dispatch to the emergency location.

The invention would also be used to include security service providers with or without the mental health service provider if there is a need. Parameters that would be more related to the security providers could be inputted such as armed versus unarmed, uniformed vs non-uniformed, as well as, the more standard experience, reviews, and geographic vicinity to again provide a rank of the most desirable security service providers for the operator to select from.

Thus, the primary object of the invention is to provide a platform for service providers to hire specialized individuals at a moment's notice and thereby supplement their ability to protect and serve the public at large. The invention does this by helping them determine what is needed by providing them the ability to elect and rank parameters needed given the situation, providing results based on the inputted parameters, ranking the service providers based on the inputted parameters, and coordinating and effecting the dispatch of the hirable service providers. The invention would also track the hired service providers as they travel to the location and update estimated arrival times. It is another object of this invention to provide a the service providers with an interface for inputting their availability, expertise, location, fees, so that it can be utilized in the selection process by hiring service provider.

In addition, the invention can be utilized for children, young adults, and adults who are suffering mental stress or anxiety in a way that best serves them in that only a qualified mental health provider need be summoned rather than an imposing and not specially trained law enforcement officer.

The invention has the result of making use of the best resources available for a given situation. This results in a more beneficial result not only to the general public, but assists in limiting the burden on law enforcement agencies who may not have the type of personnel or the number of personnel to properly handle a given situation.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIGS. 2-8 are representations of screens of electronic devices used in carrying out the novel method, each FIG. showing one communication which may play a role in performing the novel method.

FIGS. 2-8 show exemplary communications, but do not imply that such communications necessarily occur chronologically in the order presented in FIGS. 2-8.

DETAILED DESCRIPTION

Figure 1:
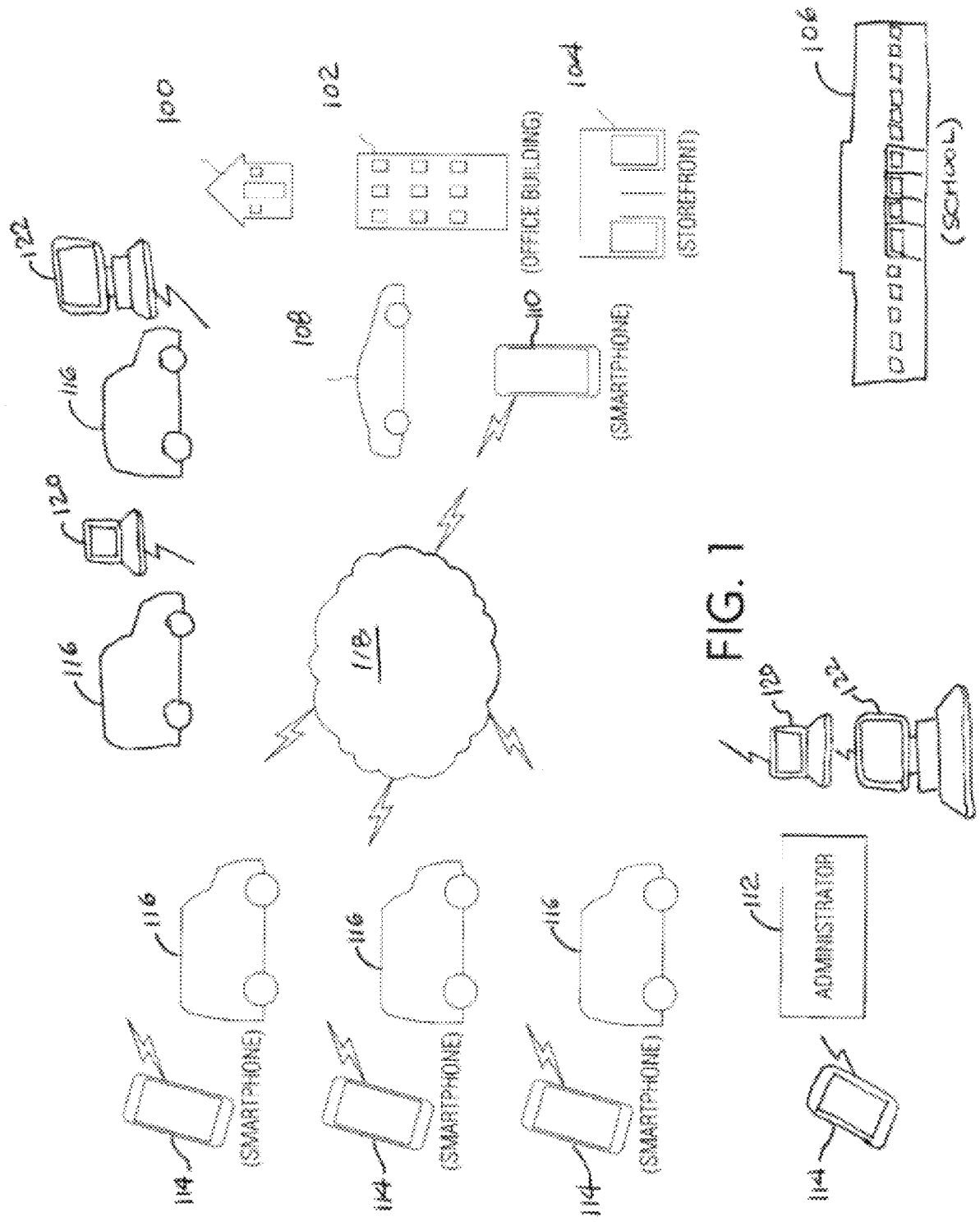
FIG. 1 is a diagrammatic representation of apparatus used in the novel method, and of significant environmental elements involved with the novel method.

Referring first to FIG. 1, according to at least one aspect of the invention, there is shown apparatus and diagrammatic environment of an emergency scene and of facilities and personnel of the emergency response team. The scene of an emergency is typically a private residence 100, an office building 102, a retail store 104, or a school 106. Of course, these are exemplary only. The scene of the emergency may comprise other forms of residences such as apartment buildings, industrial and agricultural facilities, warehouses, municipal services such as waste facilities, military facilities, recreational facilities such as a park, a stadium, a carnival site, a beach, and others.

An emergency is typically brought to the attention of authorities when an on scene observer 108 calls the authorities, such as by using a cell phone 110. Such a call for assistance is routed to a system administrator 112. Administrator 112 is shown only in representative capacity, and may comprise more than one person and more than one discrete facility. At least one person of administrator 112 has a smartphone 114 for communicating with a central processor (not separately shown, but integral with administrator 112) and with individual potential emergency responders 116. Each potential emergency responder 116 has a smartphone 114, the latter having downloaded software making its possessor part of the novel response system. The novel system may communicate by electronic telecommunications networks, shown as cloud 118.

The novel response system may be thought of as a method for remotely summoning and obtaining public order intervention at a site 100 or 102 or 104 or 106 of potential or actual public disorder (i.e., and emergency situation) by response personnel 116 tasked with maintaining public order. The method may include establishing (e.g., administered by administrator 112) a database of available response personnel 116, and of assumed availability of each one of the response personnel 116.

The method includes transmitting a request for intervention from a party (e.g., observer 108) detecting potential public disorder to administrator 112, and having system administrator 112 initially prioritize potential response personnel 116. It will be understood that this prioritization may be performed automatically by software of a data processor which is associated with administrator 112. In this sense then, administrator 112 may refer to one or more people, or, depending on context, to one or more data processors. The method includes monitoring in real time all potential response personnel 116 for availability to respond to the request for intervention. As will be further detailed hereinafter, this monitoring may be automated.

The method includes having each of the potential response personnel 116 issue an availability input declaring whether each is actually available to respond to the request for intervention. Again, this may be performed automatically by having response personnel 116 log into and out of the novel system via respective smartphones 114 (see also FIG. 8 and discussion thereof).

The method includes confirming or alternatively, revising initially prioritized potential response personnel 116 in light of reassessing initial prioritized potential response personnel 116. Based on confirming or revising the initially prioritized potential response personnel 116, a final selection of response personnel is assigned to address the potential (or actual) public disorder (i.e., the emergency).

Response personnel 116 may comprise at least one of the group including police, emergency medical responders, emergency fire responders, and qualified mental health consultants. In many situations, a number of types of response personnel 116 will not be appropriate for any one given emergency situation. It should also be noted that a variety of different emergency situations may have the advantage of including a mental health consultant or professional, as well as personnel trained to cope with the particular emergency type. Similarly, system administrator 112 may comprise a police facility such as a police station (not shown), a 911 call center (not shown), FEMA, a parent, teacher or school administrator, a qualified mental health consultant, or any combination of these.

In the method, the step of initially prioritizing selected response personnel may comprise determining an acceptable threshold of qualifications of candidates for assigned response personnel 116. This form of the method identifies a pool of potentially equally acceptable candidates.

It may be preferred that in the method, the step of initially prioritizing selected response personnel 116 comprise determining a hierarchy of qualifications of candidates for assigned response personnel 116. This form of the method generates a prioritized list of best qualified candidates. The hierarchy of qualifications is further discussed hereinafter.

In the method, the step of initially prioritizing potential response personnel 116 may comprise making a choice between response personnel 116 having means of force and response personnel not having means of force. Means of force refers to weapons which may be standard equipment for e.g. uniformed or plain clothes police officers. In some situations, the authorities may be required to respond to a weapon based threat. However, in other situations, visible presence of weapons may exacerbate the situation. Making this judgment is part of the novel system.

Optionally, in the method, the step of initially prioritizing potential response personnel 116 may comprise making a choice of selecting both responding personnel 116 having means of force and also selecting other response personnel other not having means of force. This option gives an alternative to universally armed or totally unarmed responders. For example, armed police officers may be summoned, along with unarmed mental health professionals. The intent here may be for example to have the mental health professionals take the initiative in communicating with people in distress, but to have a backup plan to deal with potential violent escalation of the situation.

The method may comprise a step of reassessing initial prioritized potential response personnel 116 in light of updating monitoring in real time and declarations of actual availability. Monitoring availability in real time may turn up a change in availability status of one or more response personnel 116. This may occur for example should some response personnel 116 be assigned to assist with another situation. A declaration of actual availability refers to an input to the system made by individual response personnel 116 on their own initiative, using for example smartphone 114.

Thus far, the novel method has been described in terms of response personnel using smartphones 114. As an alternative, the novel method may be carried out as an application at least partially downloaded to respective data processing and communications devices such as laptop computers 120 and personal computers 122 and corresponding data processing devices. In an application or on a laptop computer 120 or a personal computer 122, software may be distributed only as necessary, without the entirety of the software being loaded into any one smartphone 114, laptop computer 120, or personal computer 122.

Where the method is carried out on computers (e.g., laptop computer 120 and personal computer 122), a supporting computer program may be at least partially downloaded to such computers or to communications devices (e.g., smartphones 114) of system administrator 112 and of response personnel 116. In purely computer based embodiments of the novel system and in hybrid embodiments utilizing both smartphones 114 and also computers, communications signals used in the method may be transmitted at least partially over the internet.

Figures 4, 5:
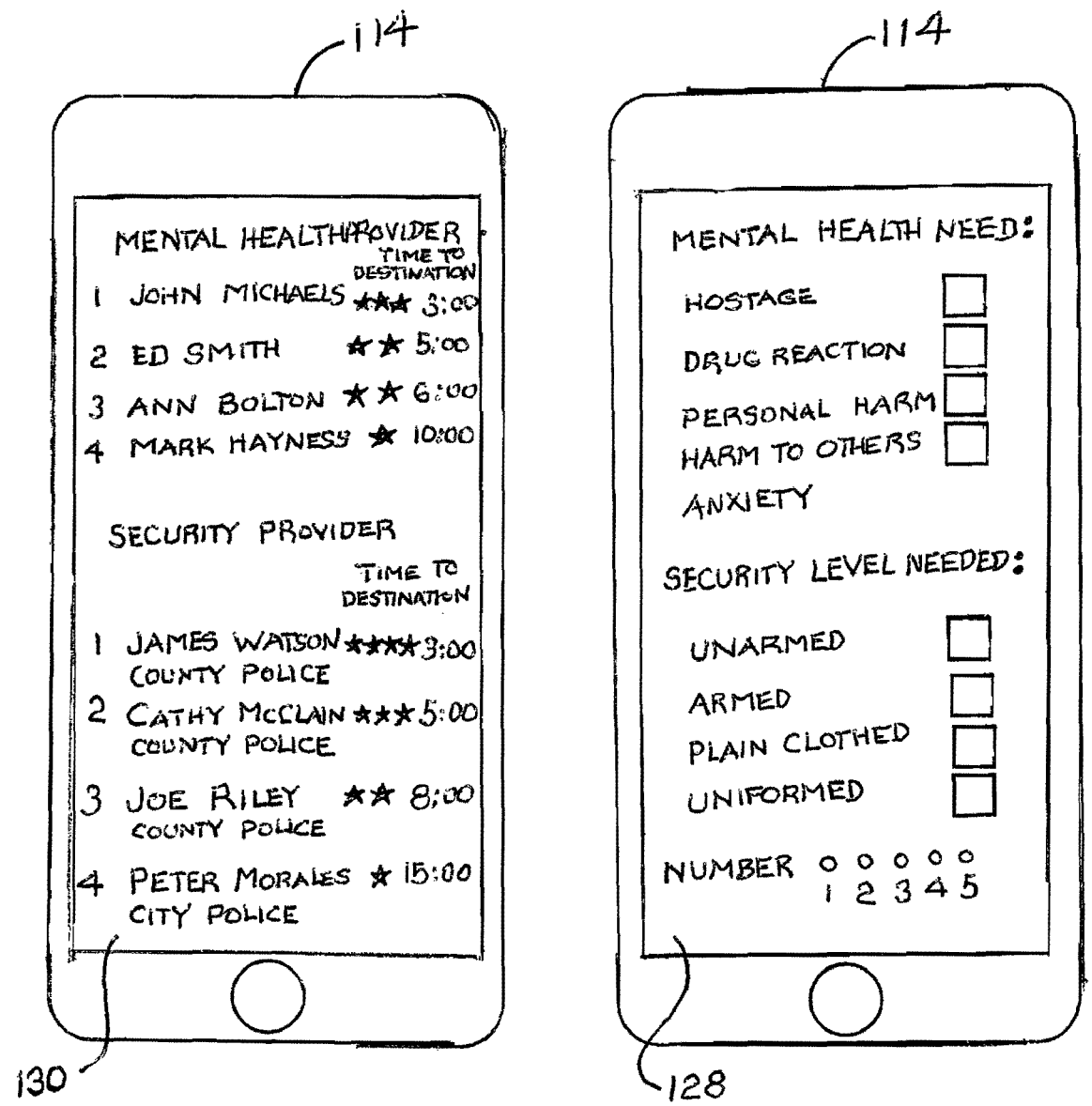
Figure 6:
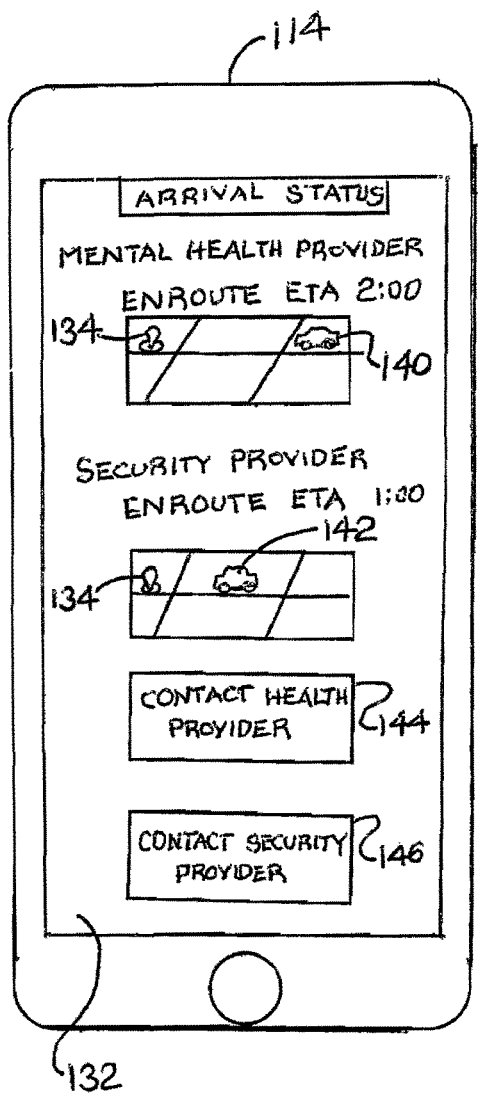

FIGS. 2-8 show exemplary screen content which may come into play as the novel method is practiced. In FIG. 2, an advisory message appearing on a screen 124 of smartphone 114 of system administrator 112 is shown. In this example, an observer 108 has reported an emergency using the 911 system. FIG. 3 shows a subsequent screen 126 wherein a map is displayed, to enable system administrator to identify a geographic location of the just-reported emergency. This location may then be forwarded to responding personnel 116. FIG. 4 shows a screen 128 enabling system administrator 112 to identify particular aspects of the emergency, so that appropriate response personnel 116 can be prioritized and assigned.

FIG. 5 shows a screen 130 identifying and prioritizing proposed response personnel 116. Divided between mental health providers or professionals, in this exemplary listing, response personnel 116 are identified by name, professional qualifications best matching the need presented by the given emergency are represented as stars such that the greater the number of stars, the better fit of the service provider (the star rating is also influenced positively if the service provider is geographically within range of the emergency or negatively if not, and with estimated response time in minutes shown.

Although content of screens 124-130 could be shared among all participants in the novel method, this content is deemed indispensable to system administrator 112. By contrast, content of screen 132 in FIG. 6 could be widely disseminated throughout participants in the novel method. Notably, screen 132 graphically reports progress of a mental health provider (represented as a vehicle 140) and of a security provider (e.g., armed police, represented as a vehicle 142) in traveling to the scene 134 of the emergency. Screen 132 also gives the operator of associated smartphone 114 automated direct access to these service providers for voice or text communication. Contact is effected by contacting screen 132 at respective contact cues 144 and 146.

Figure 7:
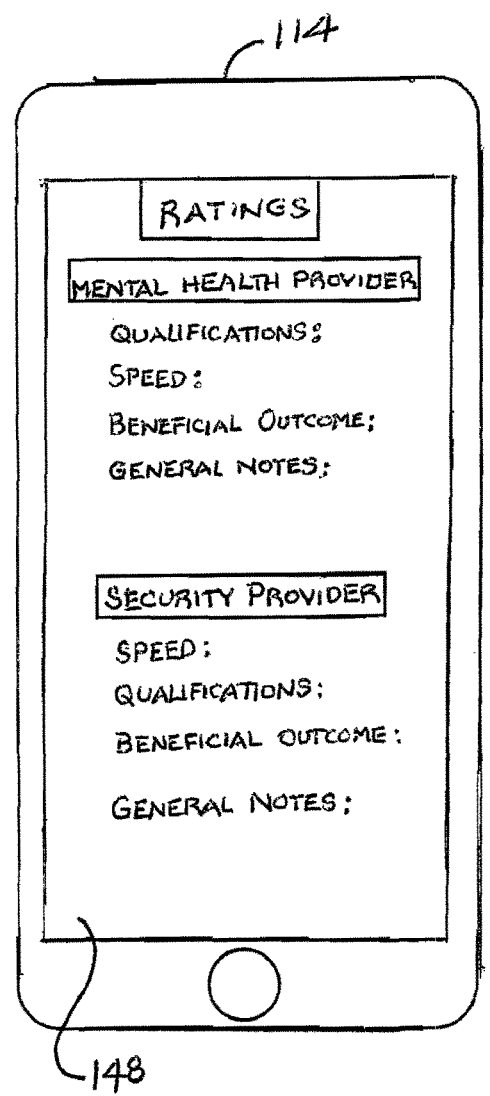

FIG. 7 illustrates a screen 148 enabling system administrator 112 to evaluate performance of emergency responders 116 after the emergency has been dealt with. These qualifications may include individual professional qualifications, adherence to projected time to arrive at the scene of the emergency, a record of how well the situation was addressed by that emergency responder 116 being evaluated, and miscellaneous information. These options are available for both mental health providers and also for security providers.

Figure 8:
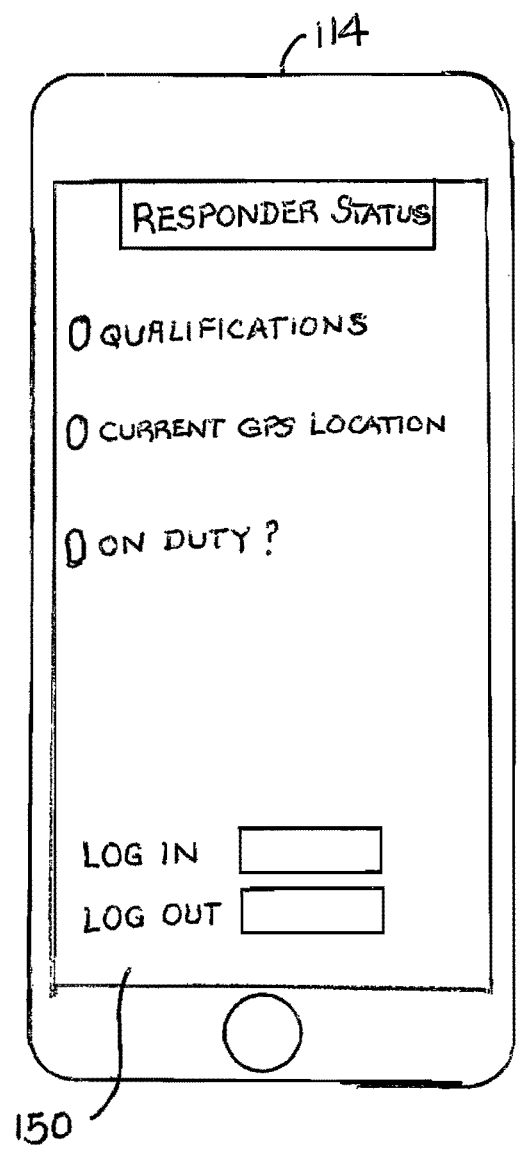

FIG. 8 shows a screen 150 comparable to screen 148 of FIG. 7, but intended to be filled out by emergency responders 116. Responders 116 may enter their professional qualifications (e.g., for updating obsolete database information), enabling current location using GPS, to enable rapid automated location and travel time calculations, and confirmation that the individual is indeed on duty. Optionally, log in and log out times may be entered. Optionally, the act of indicating that the service provider is on duty also enables current location detection. Logging in may optionally be used to infer that responder 116 is actually available. Data entered into screen 148 may operate via toggle type operators, shown at the left of a list of types of data to be entered in FIG. 8. This expedites erasure and clearing screen 148.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A system for remotely summoning and obtaining public order intervention at a site of a public disorder by response personnel tasked with maintaining public order, the method comprising:

establishing a database of available response personnel comprising a plurality of mental health service providers and a plurality of security service providers, of response qualifications of each one of the response personnel, the mental health service provider response personnel qualifications comprising a plurality of mental health specialties and the security service provider response personnel qualifications comprising a plurality of security levels, and of availability of each one of the response personnel, the database administered by a system administrator;

transmitting a request for intervention from a party observing the public disorder to the administrator;

transmitting a request via the system for intervention by the administrator, wherein administrator inputs various parameters of the public disorder, wherein the administrator parameters include the location of the disorder, the nature of the disorder, the type of service provider or providers needed chosen from mental health service providers and security service providers, qualifications needed comprising one or more mental health specialties chosen from the plurality of mental health specialties of the mental health service providers and/or one or more security levels chosen from the plurality of security levels of the security service providers, and the time frame the service provider is needed;

ranking, by the administrator, the administrator parameters by importance according to the nature of the public disorder;

assimilating the administrator parameters by way of calculations and comparisons to generate a prioritized, ranked list of potential response personnel from the database that best match the ranked administrator parameters, wherein the step of prioritizing selected response personnel comprises the following substeps:
  first, making a choice to select mental health service providers, security service providers, or both mental health service providers and security service providers as candidates for assigned response personnel;
  second, determining an acceptable threshold of qualifications of the candidates for assigned response personnel; and
  third, determining a hierarchy of qualifications of the candidates for assigned response personnel;

selecting the response personal by the administrator via the system; and monitoring in real time the progress of the response personnel to the disorder;

wherein steps of the method are carried out on computers or data processing devices through a shared supporting computer program or application at least partially downloaded to respective computers or data processing and communications devices such that:

the response personnel interface with the system through the supporting computer program or application installed on smartphones;

the system administrator interfaces with the system through the supporting computer program or application installed on database computers;

the response personnel and the system administrator interface with the system through a shared graphical user interface; and communications signals of the method are at least partially transmitted over internet computers by way of network communications protocols that include at least one of TCP, UDP, and IP;

wherein the potential response personnel are prioritized by the supporting computer program or application.

2. The system of claim 1, further comprising a step of reassessing the prioritized potential response personnel in light of updating monitoring in real time and declarations of actual availability.

3. The system of claim 1, wherein the system administrator comprises one or more people or one or more data processors at a police facility.

4. The system of claim 1, wherein the system administrator comprises one or more people or one or more data processors at a 911 call center.

5. The system of claim 1, wherein the system administrator comprises a qualified mental health consultant.

6. A method for remotely summoning and obtaining intervention at a site of potential or actual need as result of a disturbance by response personnel tasked with assisting with such need, the method comprising:

establishing a database in the system of available response personnel comprising a plurality of mental health service providers and a plurality of security service providers, of response qualifications of each one of the response personnel, the mental health service provider response personnel qualifications comprising a plurality of mental health specialties and the security service provider response personnel qualifications comprising a plurality of security levels, and availability of each one of the response personnel, the database accessed by an observer of the disturbance;

transmitting a request via the system for intervention by the observer, wherein the observer inputs various parameters of the disturbance, where the observer parameters include the location of the disturbance, the nature of the disturbance, the type of service provider or providers needed chosen from mental health service providers and security service providers, qualifications needed comprising one or more mental health specialties chosen from the plurality of mental health specialties of the mental health service providers and/or one or more security levels chosen from the plurality of security levels of the security service providers, and the time frame the service provider is needed;

ranking, by the observer, the observer parameters by importance according to the nature of the disturbance:

assimilating the observer parameters by way of calculations and comparisons to generate a prioritized, ranked list of potential response personnel from the database that best match the ranked observer parameters, wherein the step of prioritizing selected response personnel comprises the following substeps:
  first, making a choice to select mental health service providers, security service providers, or both mental health service providers and security service providers as candidates for assigned response personnel;
  second, determining an acceptable threshold of qualifications of the S.BEN-001 candidates for assigned response personnel;
  third, determining a hierarchy of qualifications of the candidates for assigned response personnel; and selecting the response personnel by the observer via the system; and monitoring in real time the progress of the response personnel to the disturbance;

wherein steps of the method are carried out on computers or data processing devices through a shared supporting computer program or application at least partially downloaded to respective computers or data processing and communications devices such that:

the response personnel interface with the system through the supporting computer program or application installed on smartphones;

the observer interfaces with the system through the supporting computer program or application installed on database computers;

the response personnel and the observer interface with the system through a shared graphical user interface; and communications signals of the method are at least partially transmitted over internet computers by way of network communications protocols that include at least one of TCP, UDP, and IP;

wherein the potential response personnel are prioritized by the supporting computer program or application.

7. The method of claim 6, wherein the observer is selected from the group consisting of a parent, teacher, and employee.

\* \* \* \* \*